(12) United States Patent
Farkas et al.

(10) Patent No.: US 8,837,329 B2
(45) Date of Patent: Sep. 16, 2014

(54) METHOD AND SYSTEM FOR CONTROLLED TREE MANAGEMENT (75) Inventors: János Farkas, Kecskemét (HU); Csaba Antal, Kiskunlacháza (HU); Attila Takács, Budapest (HU); Panagiotis Saltsidis, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 509 days.

(21) Appl. No.: 12/525,062

(22) PCT Filed: Jan. 18, 2008

(86) PCT No.: PCT/IB2008/000115
§ 371 (c)(1),
(2), (4) Date: Jul. 29, 2009

(87) PCT Pub. No.: WO2008/087543
PCT Pub. Date: Jul. 24, 2008

(65) Prior Publication Data
US 2011/0080854 A1    Apr. 7, 2011

Related U.S. Application Data

(60) Provisional application No. 60/885,669, filed on Jan. 19, 2007.

(51) Int. Cl.
*H04L 12/28* (2006.01)
*H04L 12/705* (2013.01)
*H04L 12/721* (2013.01)
*H04L 12/751* (2013.01)
*H04L 12/703* (2013.01)
*H04L 12/753* (2013.01)
*H04L 12/46* (2006.01)
*H04L 12/24* (2006.01)

(52) U.S. Cl.
CPC .............. *H04L 12/462* (2013.01); *H04L 45/18* (2013.01); *H04L 45/12* (2013.01); *H04L 45/02* (2013.01); *H04L 41/069* (2013.01); *H04L 45/28* (2013.01); *H04L 45/48* (2013.01); *H04L 41/12* (2013.01); *H04L 41/0856* (2013.01); *H04L 41/0853* (2013.01)
USPC ........................................... 370/256; 709/242

(58) Field of Classification Search
None
See application file for complete search history.

(56) References Cited

U.S. PATENT DOCUMENTS

| | | | |
|---|---|---|---|
| 6,578,086 B1 * | 6/2003 | Regan et al. ................... | 709/242 |
| 2003/0005149 A1 * | 1/2003 | Haas et al. ..................... | 709/238 |

(Continued)

OTHER PUBLICATIONS

Finn, Norman. Shortest Path Routing, XP002485131, Jan. 3, 2006.
Finn, Norman; "Shortest Path Bridging"; Sep. 22, 2005; pp. 1-95 XP002471513.
IEEE 802.1aq Virtual Bridged Local Area Networks—Amendment

(Continued)

*Primary Examiner* — Nicholas Sloms (57) ABSTRACT

There is disclosed a method and apparatus for facilitating a network, such as an Ethernet LAN, for efficient forwarding of data traffic by collecting neighbor information, generating and distributing link state advertisements, populating a topology database for the network, and calculating trees for each bridge serving as a root bridge. In a preferred embodiment the method and system also prepare one or more backup topologies, and store them for use if they are needed due to a failure condition detected in the network. In a particularly preferred embodiment, probabilities are assigned to various potential failure conditions, and the probability values are used to decide which backup topologies to calculate, store, or use.

20 Claims, 9 Drawing Sheets

(56) References Cited

U.S. PATENT DOCUMENTS

2003/0169694 A1\* 9/2003 Seaman ................. 370/254
2006/0007869 A1   1/2006 Hirota et al.
2006/0251065 A1\* 11/2006 Hamamoto et al. ......... 370/389
2007/0019646 A1\* 1/2007 Bryant et al. ................ 370/390

OTHER PUBLICATIONS

9: Shortest Path Bridging, Draft D0.3, May 9, 2006.
Seaman, Mick; "Shortest Path Bridging"; Mar. 2005.
Finn, Norman; "MSTP Reflection Vector"; Mar. 2005.
Finn, Norman; "Shortest Path Bridging"; Jan. 2006.

\* cited by examiner

METHOD AND SYSTEM FOR CONTROLLED TREE MANAGEMENT

RELATED APPLICATION AND CLAIM OF PRIORITY

This application is related to and claims benefit of the filing date of U.S. Provisional Patent Application No. 60/885,669 filed Jan. 19, 2007, which is entirely incorporated by reference herein.

TECHNICAL FIELD OF THE INVENTION

The present invention is directed, in general, to controlling data traffic in computer networks and, more specifically, to a method and system for controlled tree management in Ethernets and similar networks using link state principles.

BACKGROUND OF THE INVENTION

Computers, broadly speaking, are electronic machines capable of storing and manipulating information, often called data, to useful ends. Frequently, a number of computers are connected together in such a way that they are able to send data to each other. A collection of computers so connected is often called a network, and the connector between two network nodes is referred to as a link. One type of computer network is called a LAN (local area network), and may be found, for example, in the offices of a small business or educational institution. A number of LANs or other networks may also be brought into communication with each other. As might be expected, a system of rules or set procedures must be put in place so that the computers and networks can communicate with each other effectively. Such a system of rules and procedures is often called a protocol, and several have been developed for communications involving computer networks.

A widely accepted set of protocols for LAN communications has been developed under the auspices of the IEEE (Institute of Electrical and Electronics Engineers). A standard generally referred to as IEEE 802, for example, covers general network architecture, IEEE 802.1 deals with bridging and management, and IEEE 802.3 is the Ethernet protocol. An Ethernet LAN is one that handles traffic, that is, the flow of data from one computer to one or more other, using a system of collision detection and avoidance. (A 'collision' occurs when two or more computers attempt to send data over the same link at the same time.) These standards are regularly reviewed and updated as necessary to improve networks operations and account for developments in technology.

In a typical Ethernet network, data sent from one computer to another, or from one network to another, is not transmitted all at once or continuously, but is instead broken up into discrete 'frames'. The frames may vary in length, but each frame includes sufficient address information (in addition to the actual data) so it they may be routed to its desired destination or destinations. Routing is necessary because every computer is not connected directly to every other. Instead, computers and networks are connected to intermediary devices that receive data, determine its destination address, and then route it accordingly. One such intermediary device is referred to as a bridge. A bridge is a type of software switch resident on a network component. A frame of data may be routed through many bridges on its way from source to destination.

Figure 3:
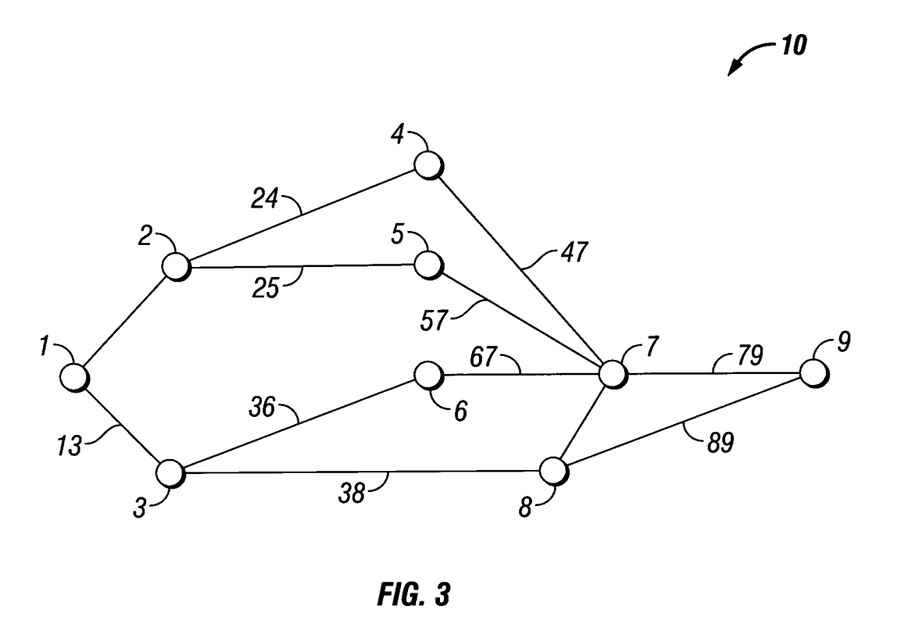
FIG. 3 is a simplified schematic diagram illustrating the bridges of an exemplary network, in which embodiments of the present invention may be advantageously implemented.
Figure 15:
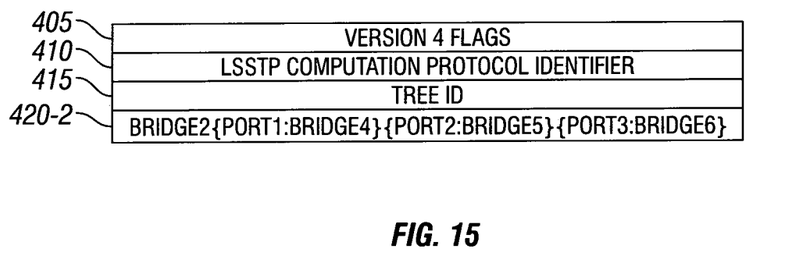
FIG. 15 illustrates a tree description for the Bridge 2 shown in FIG. 9 according to an embodiment of the present invention.

FIG. 3 is a simplified schematic diagram illustrating the bridges of an exemplary network 10, in which embodiments of the present invention may be advantageously implemented. The network may have many components, but for clarity only the bridges themselves are shown. Individual components such as computers and sub-networks may be connected to one of the bridges. In the embodiment of FIG. 3, there are nine bridges, numbered 1 through 9, although the present invention is also suitable for implementation in larger or smaller networks. Each of these bridges 1 through 9 is connected by a link to one or more other bridges. In FIG. 15 the links are numbered according to the bridges it connects, for example link 24 connects bridge 2 with bridge 4. When a bridge receives a data frame from, for example, a network computer or another bridge, it examines the address information and forwards the frame accordingly. Data may have to pass through several bridges from its source to destination. Without some governing protocol, however, it is possible that frames of data might inadvertently be sent from bridge to bridge, eventually looping back to a previously-visited bridge from which they are re-sent back into the same loop. As should be apparent, this is not a desirable phenomenon and techniques have evolved for avoiding this looping problem.

One technique to avoid looping would be to use a fixed-configuration network and always route frames intended for a particular destination by the same route. Most networks are subject to change, however, and occasionally encounter failures in components and links. A static routing system is therefore not the best solution. In a more successful solution, a 'spanning tree' is calculated periodically according to a spanning tree protocol (STP). The spanning tree provides path definitions for the network as it exists at the time of the tree calculation. In the event of a failure or other event, the tree can be recalculated to adjust to the new conditions.

In Shortest Path Bridging (SPB), specified for example in IEEE 802.1aq Virtual Bridged Local Area Networks— Amendment 9: Shortest Path Bridging, Draft D0.3, May 9, 2006, an attempt is made to provide the shortest path between any two bridges of and Ethernet network. In this proposed solution, each bridge maintains a separate tree. (Or at least each 'edge bridge'; bridges that connect only to other bridges and not to any other device may not form the root of their own tree.) Frames of data arriving at a bridge directly from an end station are forwarded from the bridge to the bridge's tree, in which it is the root bridge.

The current SPB proposal is based on the path vector approach. The path vector scheme allows any two bridges to choose symmetrical paths between them, which are required for the MAC (media access control) learning process to work correctly. The path vector approach provides the shortest path (that is, the one with the least administrative cost) between any two bridges. It provides only the shortest path, however, meaning that other objectives cannot be considered even if that would be desirable. And since MAC learning is applied for the multiple spanning trees associated with the various bridges, different convergence times for the different trees may result. This produces a temporal inconsistency that may result in excessive broadcasting. It is believed, however, that recovery time could be improved if the path vector approach could be replaced with a link state approach.

In general, the link state approach, using routing protocols such as OSPF (open shortest path first) and IS-IS (intermediate system to intermediate system), facilitates application of traffic engineering and allows the active topology to be optimized. Directly implementing these IP routing protocols, however, would mean each bridge would have to set up its own forwarding tables. This procedure is not a detriment in and of itself, and could be applied to SPB, but on the other hand it may produce long unavailable periods resulting in at least transient loops. Another complication is that Ethernet frames do not include a TTL (time to live) field (as does an IP packet) so transient loops may be problematic when changes in active topology are occurring. Of course, bridges that notice the topology is changing could simply stop forwarding data frames until a new topology is calculated, but this procedure slows down the recovery significantly.

The convergence time in the currently proposed SPB approach could theoretically be improved by a protection switching scheme where both primary and backup trees are maintained. In practice, however, a single backup tree cannot provide protection against all possible failures, and using multiple backup trees in a system, such as SPB, that requires a tree for each bridge, might significantly or even severely tax system resources.

There is therefore a need in the art for a way to implement a link state approach to support the multiple spanning trees used in SPB. The present invention provides just such a solution.

SUMMARY OF THE INVENTION

To address the above-discussed deficiencies of the prior art, it is a primary object of the present invention to provide a method and arrangement for implementing a link state spanning tree approach that can support an SPB (Short Path Bridging) application using of multiple spanning trees. It is a further object of the present invention to provide greater assurance of symmetric forwarding paths between any pair of root bridges on SPB trees. It is a further object of the invention to attempt to decrease the recovery time in the event of a failure in the network.

In one aspect, the invention is a method for configuring a network, such as an Ethernet LAN, for efficient forwarding of data traffic, including collecting neighbor information, generating and distributing link state advertisements, populating a topology database for the network, and calculating trees for each bridge serving as a root bridge. The trees may be calculated in the respective root bridges themselves, or may be calculated in a master bridge if one has been selected. In either case, however, the calculation is based on the populated topology database or databases. The method may further include advertising the tree by selectively distributing tree advertisement messages, receiving tree advertisement messages in bridges of the network, and configuring the ports of each bridge according to the advertisement message. The method may also further include the feature of recognizing, in a network bridge, that a link state advertisement has already been processed, and to discard rather than forward them. In this way, a protocol for links states STP is defined that allows the application of flexible sets of routing objectives. In a preferred embodiment the method may further include preparing one or more backup topologies, and storing them for use if they are needed do to a failure condition detected in the network.

In another aspect, the present invention is a master bridge arranged for performing the method described above. In yet another aspect, the present invention is a network, such as an Ethernet LAN, arranged to perform the method of the present invention.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. In particular, a controller may comprise one or more data processors, and associated input/output devices and memory, that execute one or more application programs and/or an operating system program. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 18, discussed herein, and the various embodiments used to describe the principles of the present invention in this patent document are by way of illustration only and should not be construed in any way to limit the scope of the invention. Those skilled in the art will understand that the principles of the present invention may be implemented in any suitably arranged computer network.

Figure 4:
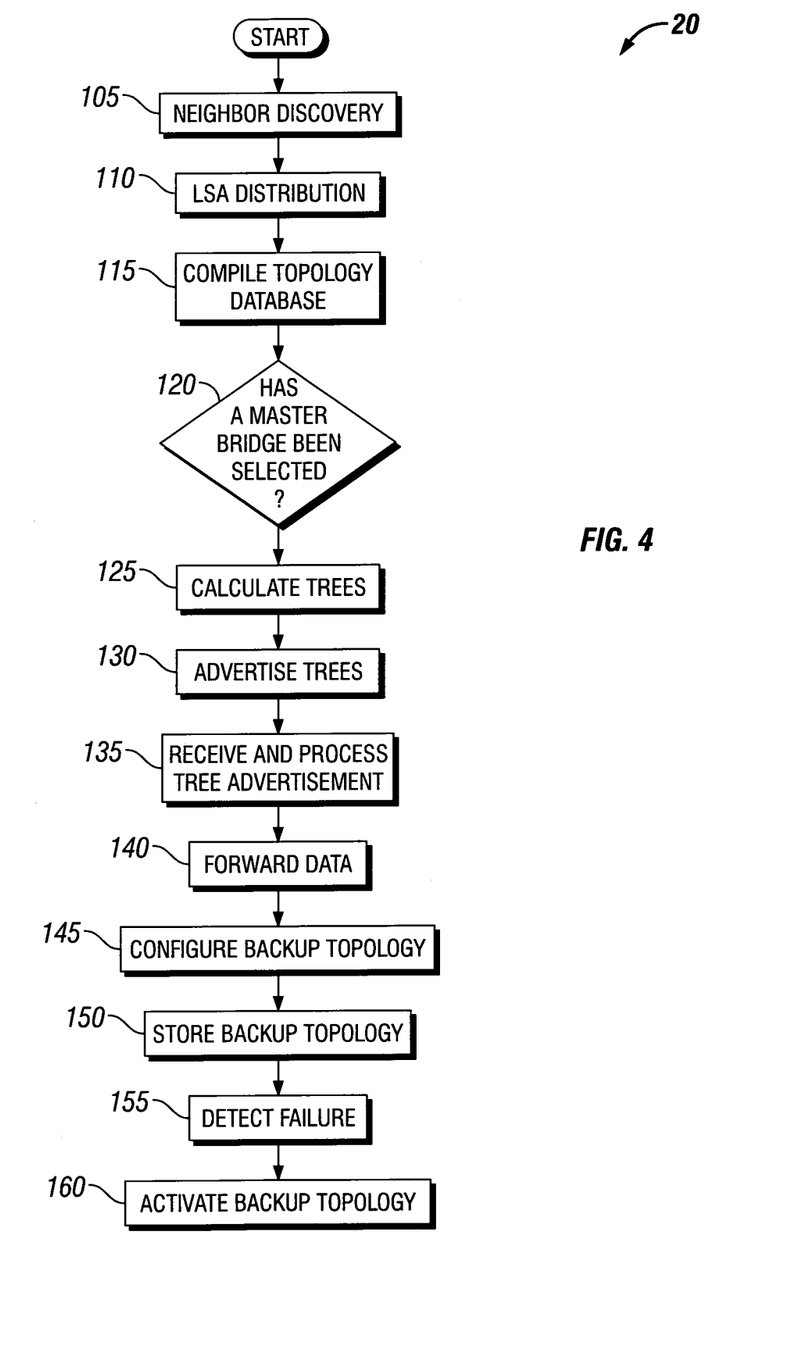
FIG. 4 is a flow diagram illustrating a method of facilitating data traffic flow according to an embodiment of the present invention.

The present invention is directed to a manner of using link state protocol principles in the implementation of a SPB (shortest path bridging) scheme for facilitating the flow of data traffic in a computer network, for example an Ethernet LAN (local area network). FIG. 4 is a flow diagram illustrating a method 20 of facilitating data traffic flow according to an embodiment of the present invention. At START it is assumed that a network operable to communicate data via a plurality of bridges has been formed, such as the one shown in FIG. 3. The network is, for example, an Ethernet LAN network operable according to the IEEE 802 family of protocols, but other similarly arranged networks may be used as well. The process begins when the network is assembled and energized for operation, or at some later time as determined by a network operator.

Returning to the method 20 of FIG. 4, in step 105 neighbor discovery is undertaken, so that each of the network bridges may learn the other bridges to which they are connected. The information discovered in the neighbor discovery step 105 is then transmitted (step 110) to other bridges via LSAs (link state advertisements). Although the LSAs flood the network, in a preferred embodiment they will be discarded (step not shown) by bridges that, for example, realize they have already learned the information contained in a particular LSA.

In this embodiment, each of the bridges then compiles a topology database (step 115). It is then determined whether a master bridge has been selected for the network (step 120). Trees for each bridge are then calculated (step 125); this is performed by the master bridge if one has been selected, or by each bridge configuring their own tree as a root bridge. Calculating trees for each bridge as a root bridge also includes determining the port settings for the non-root bridges in each of the trees. The tree configurations are then advertised (step 130) using TAs to selected network components. Each bridge then processes the TA messages and sets its ports (step 135) according to the instructions contained in the TA. The spanning tree has at this point been configured according to an embodiment of the present invention and the routing of data traffic (step 140) may either begin, or continue, as the case may be.

In accordance with a preferred embodiment of the present invention, one or more backup topologies are then configured (step 145). This is best done when the primary active topology has been established and the network is stable, but can also be performed earlier (not shown) and advertised at the same time as the active topology. In the preferred embodiment, however, the backup topology or topologies are stored (step 150). There are a number of storage options available. The backup topology could be stored at the master bridge, if one has been selected. (Presumably, if one has been selected the backup topology has also been calculated there.) It could also be stored by including corresponding tree configurations in tree advertisement messages and distributing them. The recipient bridges, upon receiving the backup tree advertisement messages, preferably recognize them and such and simply store them. These may in some cases be each root bridge for a backup tree, or could include all of the bridges in the tree.

In either case, when a failure condition is detected (step 155), that is, when data forwarding cannot for some reason proceed according to the active topology, a backup topology is activated (step 160). The method of activation will vary according to the storage method selected. If stored at the master bridge, for example, the backup topology is advertised in the normal fashion. If backup tree advertising messages have already been distributed, however, an activation message of some kind is sent, alerting the affected bridges to retrieve the stored advertising message and act on it. Where multiple backup topologies have been calculated, of course, only one is typically selected for activation.

In a particularly preferred embodiment, an analysis (not shown) of potential failure conditions is made, and a probability value assigned to each one. When this is done, the calculation of backup trees may be limited to only those scenarios having a higher probability of occurrence. The probability values may also be used when selecting one of a number of previously stored backup topologies for implementation.

The variation operations associated with embodiments of the present invention will now be described in greater detail. For this purpose, it will be presumed that various of the message described above, such as LSAs and TAs, are in the format of standard BPDUs (bridge protocol data units) that have been modified according to the present invention for their respective purpose. The use of modified BPDUs in this way is preferred but not required.

Figure 5:
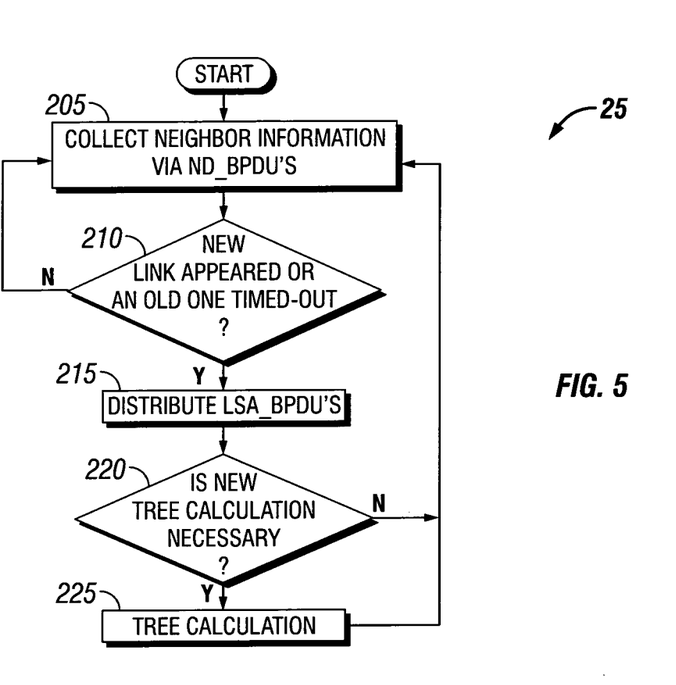
FIG. 5 is a flow diagram illustrating a method of performing neighbor discovery according to an embodiment of the present invention.

FIG. 5 is a flow diagram illustrating a method 25 of performing neighbor discovery according to an embodiment of the present invention. Again, at START, the network is presumed to be physically assembled and operable according to the method of the present invention. In this embodiment, neighbor information is collected via neighbor discovery messages, and preferably ND_BPDUs (step 205). Other types of messages may be used for collection of neighbor information may be used in other embodiments. In this embodiment, ND_BPDUs are sent and received according to a predetermined time period (the "Hello Time Period"). The received ND_BPDUs are examined and the information stored in a topology database (step not shown) for later reference.

As ND_BPDUs are received each Hello Time Period, many times they will contain information already stored in the topology database. At other times, a new neighbor may manifest itself, or an expected ND_BPDU is not received, signaling a change in the configuration of the network. Therefore, each Hello Time Period each bridge examines the ND_BPDUs received and determines (step 210) if a new link has appeared or an existing one has timed out. That is, entries in the topology database may be timed out and erased after a predetermined number of Hello Time Periods if no ND_BPDU confirming their validity has been received. If no change occurs, the process simply returns to step 205 and collecting neighbor information as it is disseminated each Hello Time Period. If a change has been perceived, the bridge distributes LSA_BPDUs (step 215) to advertise the change. The topology database may also be updated at this time (step not shown). Each bridge then determines if a new tree calculation is necessary (step 220) and, if so, performs a tree calculation (step 225) with the newly acquired network information. Note that in accordance with the present invention, each bridge that receives data from a network element performs the tree calculation process. In accordance with the present invention, the bridges may run any active topology algorithm to build up the tree.

Figure 6:
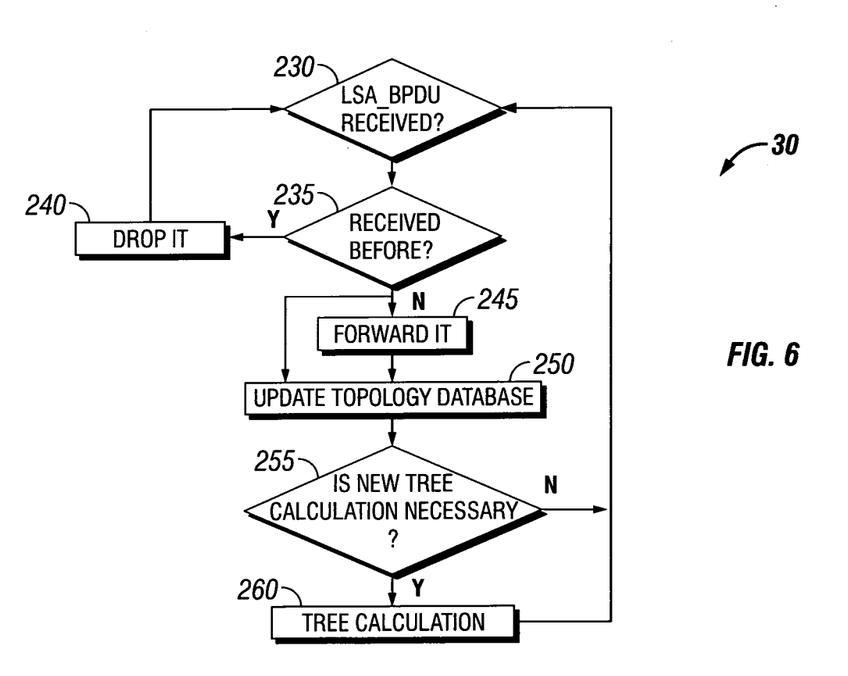
FIG. 6 is a flow diagram illustrating a method of processing a link state advertisement (LSA) according to an embodiment of the present invention.

The LSA_BPDUs distributed in step 215 are subsequently received in the various network bridges. FIG. 6 is a flow diagram illustrating a method 30 of processing a link state advertisement (LSA) according to an embodiment of the present invention. When an LSD_BDPU is received (step 230) at a bridge it is first examined (step 235) to determine whether it is outdated or has been received previously. This may be done using one or more techniques. For example, the receiving bridge may examine a sequence number and sending-bridge identifier of the LSA_BPDU. If a newer LSA_BPDU has already been received from that bridge, the one being examined may be discarded. In another embodiment, a path vector mechanism is employed and the receiving bridge checks to see if its own bit is set to determine whether the LSA_BDPU has been seen before. In yet another embodiment, a time-to-live field (TTL) may be utilized, with LSA_BDPUs being examined for age. If one or more of these methods indicates that the LSA_BPDU is no longer useful, it is discarded (step 240). This helps to prevent LSA_BPDUs from continuing to circulate unnecessarily in the network when they are no longer useful (although, depending on the determining technique used, they may under certain conditions be processed more than once in the same bridge).

If the LSA_BDPU has not been received before, then it is forwarded (step 245) on each port of the bridge, except for the one on which it was received, and the bridge's topology database is updated (step 250). As in FIG. 5, each bridge, having updated its topology database, then determines if a tree change is necessary (step 255) and, if so, performs a tree calculation (step 260) with the newly acquired network information.

In SPC forwarding path control, each bridge (or at least each bridge though which data is received from an end component) calculates it own tree, assuming for itself the position of root branch, based on its topology database. In an alternate embodiment of the present invention, a master bridge calculates all necessary active topologies.

Figure 1:
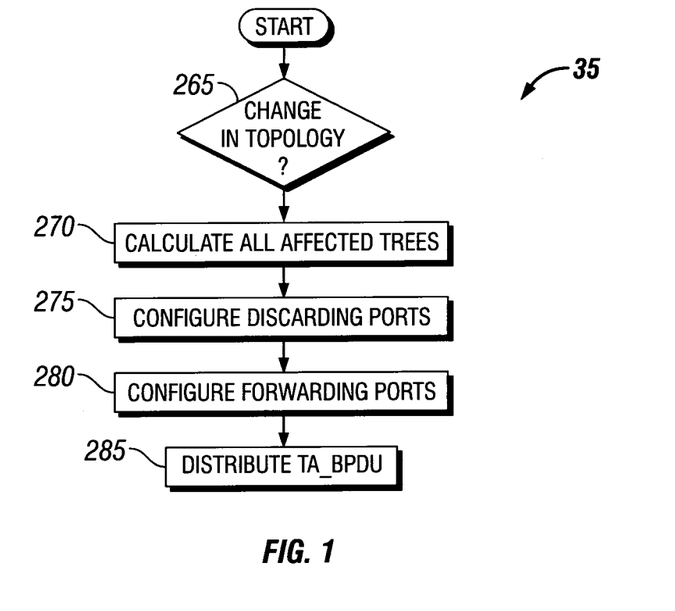
FIG. 1 is a flow diagram illustrating a method of tree calculation in the master bridge according to an embodiment of the present invention.

The tree calculation process undertaken by the root bridge according to one embodiment of the present invention is shown in FIG. 1. FIG. 1 is a flow diagram illustrating a method 35 of tree calculation using a master bridge according to an embodiment of the present invention. At START it is again presumed that an operable network is in place, and in this embodiment that a suitable master bridge has been selected and configured. The master bridge may be the most powerful bridge available in the network, or another bridge may be selected for other reasons. A master bridge may, in some application, simply be selected randomly, so long as it has the capabilities necessary to perform master-bridge functions. If a master bridge fails, of course, another may have to be selected, and a backup may be designated in advance for this purpose. The master bridge selection may be the bridge with the highest priority. In some cases the network operator may configure the priority of one or more bridges to influence the master bridge selection. An advantage of using a master bridge for all tree calculations is that only one (or perhaps only one plus one backup) bridge need have the necessary capabilities for the task. Other bridges that are not anticipated to have to perform tree calculation may be simpler in design, and perhaps less expensive to acquire.

The method 35 of FIG. 1 begins with determining whether a change in the network topology that requires at least one new tree calculation has occurred (step 265). (Not all topology changes will require recalculation.) This determination may be performed at regular intervals, or upon the happening of a triggering event, or both. If a tree change is not necessary, of course, the ordinary operation of the network may simply continue. If at least one tree change is determined to be necessary, then the method 35 proceeds to the calculation of all necessary new trees using the current topology database (step 270). The master bridge then configures discarding ports (step 275), followed by a configuration of forwarding ports (step 280). The tree configuration is then distributed throughout the network (step 285), for example using TA_BPDU messages.

Figure 7:
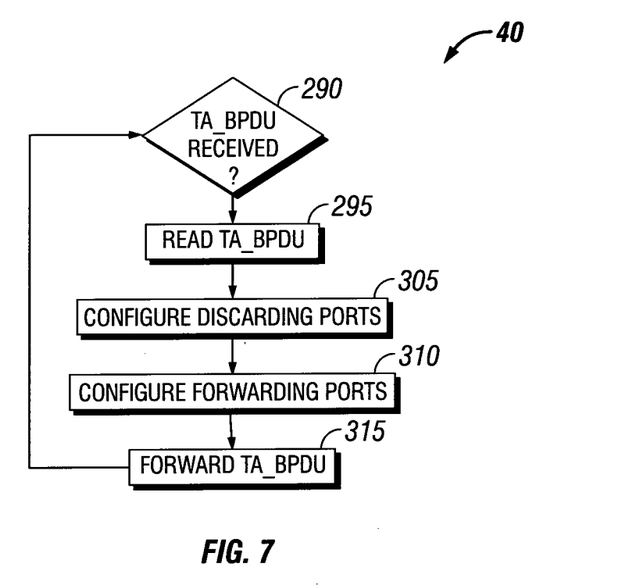
FIG. 7 is a flow diagram illustrating a method of processing a tree configuration message according to an embodiment of the present invention.

In this embodiment, when a TA_BPDU (or other tree advertisement message) is received at a non-master bridge, it is processed and forwarded as necessary. FIG. 7 is a flow diagram illustrating a method 40 of processing a tree configuration message in a non-master bridge according to an embodiment of the present invention. The process begins with determining whether a TA_BPDU has been received (step 290). If not, of course, the routing of data traffic, if any, may continue normally. If so, the TA_BPDU is read (step 295), and the discarding ports, of any, are configured (step 305). The discarding ports do not have to be configured first, but his order is preferred and helpful to creating a loop-free topology. The forwarding ports, if any, are then configured (step 310). Assuming at least one forwarding port has been configured, the TA_BPDU is then forwarded on each of the bridge's forwarding ports (step 315).

Figure 2:
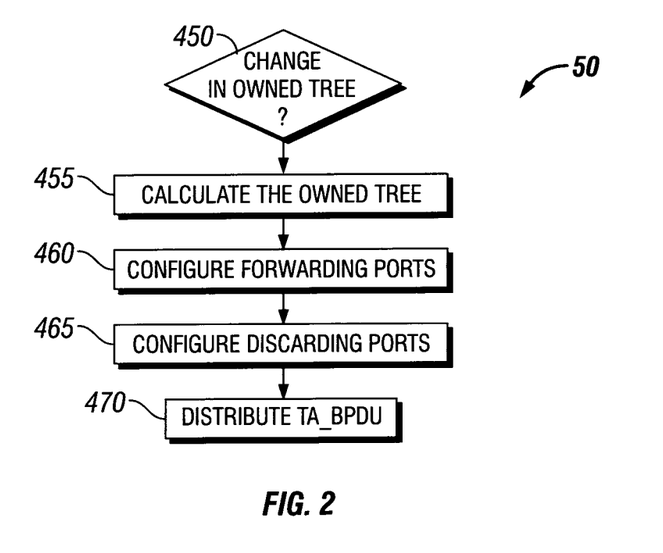
FIG. 2 is a flow diagram illustrating a method of tree calculation in the master bridge according to an embodiment of the present invention.

As each bridge in the network is made aware of the network topology though the neighbor discovery and LSA distribution described above, each may be set to anticipate the arrival of a TA_BPDU originating from the master bridge when a topology change is detected (or within a certain interval thereafter). In this case, when a TA_BPDU does not arrive when expected, a master bridge failure may be indicated and a new master will have to be selected according to the backup procedure for the network in question. Alternately, upon detecting a master bridge failure, the bridge may perform its own tree calculation. FIG. 2 is a flow diagram illustrating a method 50 of tree configuration in a non-master bridge according to an embodiment of the present invention. This approach is referred to as RCOPB (Root Controlled Optimal Path Bridging). The process begins with determining that a change in the bridge's owned tree necessitating a new tree calculation has occurred (step 450). Not all topology changes, of course, will necessitate a tree recalculation. Where the removal of a link or bridge is detected, for example, that was not part of the tree owned by the bridge, a new tree need not be calculated. If no tree calculation is needed, of course, the routing of data traffic, if any, may continue normally. If recalculation is necessary, however, the bridge proceeds to calculate its owned tree with itself as the root bridge (step 455). The forwarding ports are then configured (step 460), followed by configuration of the discarding ports, of any (step 465). The discarding ports may also be configured first, before the forwarding ports. A TA_BPDU advertising the calculated tree is then forwarded on each of the bridge's forwarding ports (step 470). Note the method of FIG. 2, RCOPB, may also be used for reasons other than master bridge failure, and of course may be used in networks where no master bridge designation is made.

Figure 8:
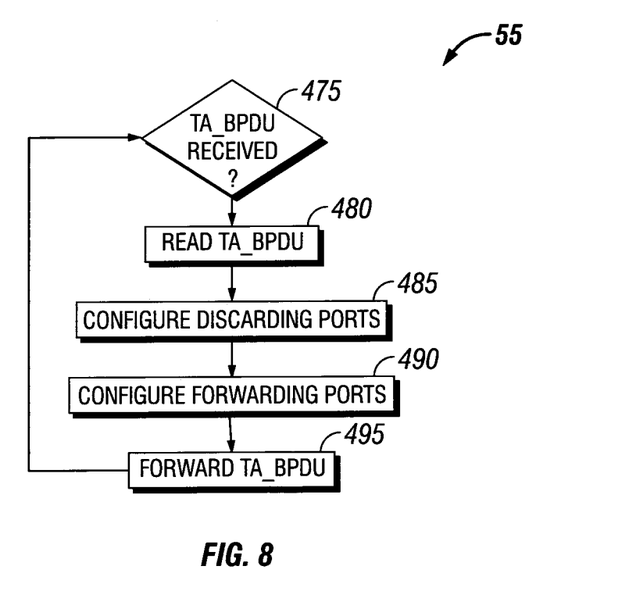
FIG. 8 is a flow diagram illustrating a method of tree configuration in a non-root bridge according to an embodiment of the present invention.

When the TA_BPDU (or other tree advertisement message) is received at a non-root bridge of the particular tree, it is processed and forwarded as necessary. FIG. 8 is a flow diagram illustrating a method 55 of tree configuration in a non-root bridge according to an embodiment of the present invention. The process begins with determining whether a TA_BPDU has been received (step 475). If not, of course, the routing of data traffic, if any, may continue normally. If so, the TA_BPDU is read (step 480), and the discarding ports, of any, are configured (step 485). The discarding ports do not have to be configured first, but his order is preferred and helpful to creating a loop-free topology. The forwarding ports, if any, are then configured (step 490). Assuming at least one forwarding port has been configured, the TA_BPDU is then forwarded on each of the bridge's forwarding ports (step 495).

Figure 9:
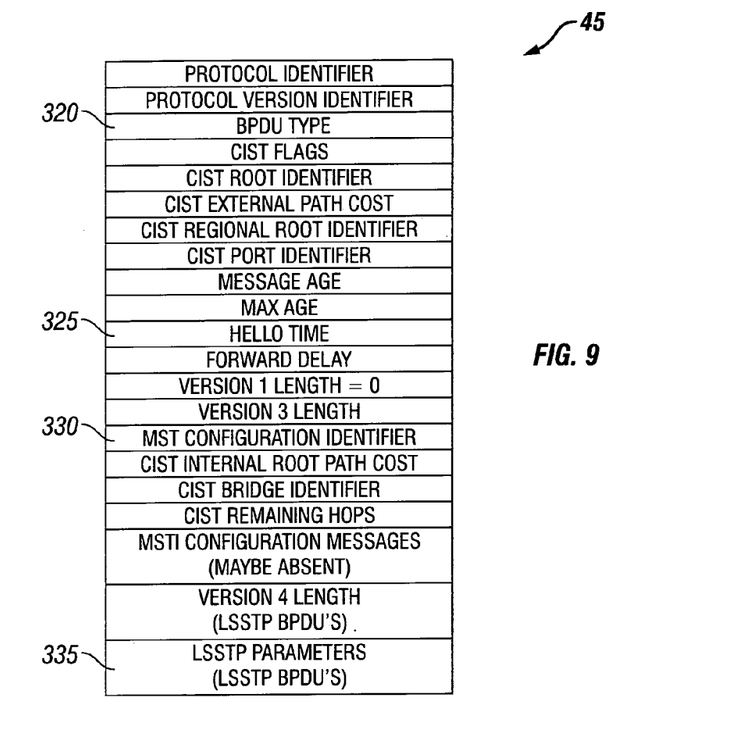
FIG. 9 depicts a LSSTP_BPDU (link state spanning tree protocol bridge protocol data unit) according to an embodiment of the present invention.

The format of BPDU messages follows generally the MSTP BPDU format of IEEE 802, with certain differences and special considerations as set forth below and in FIGS. 9 though 17. FIG. 9 depicts a LSSTP_BPDU (link state spanning tree protocol BPDU) 45, according to an embodiment of the present invention. Regarding the fields of the LSSTP_BPDU especially related to implementation of the present invention, the BPDU type field 320 will reflect that this is an LSSTP_BPDU message. The Hello Time field 325 is used only in ND_BPDUs, not in other types of LSSTP_BPDUs. Note that the tree configuration identifier field 330 is the same as is proposed in IEEE 802.1ap Virtual Bridged Local Area Networks—Amendment 9: Shortest Path Bridging, Draft D0.3, dated May 9, 2006. The LSSTP Parameters 335 vary according to the type of LSSTP_BPDU, as described in more detail below.

For an ND_BPDU according to the present invention, the LSSTP Parameters 335 are empty, as the necessary corresponding-link bridge and port identifiers are currently specified in the proposed IEEE 802 MSTP BPDU. In other words, the neighbor discovery process does not require additional LSSTP parameters for successful operation.

Figure 10A:
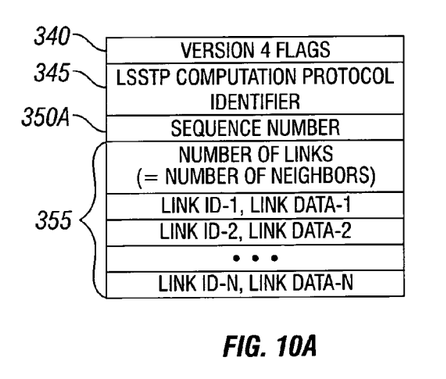
FIGS. 10a through 10c illustrate LSSTP parameters for an LSA_BDPU according to embodiments of the present invention.
Figure 10B:
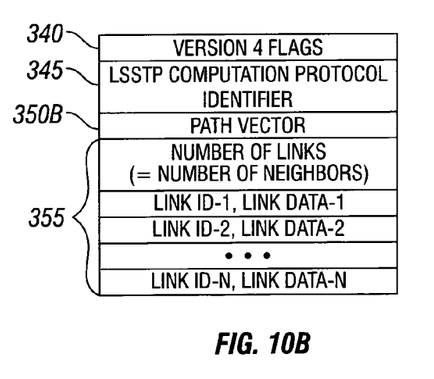
Figure 10C:
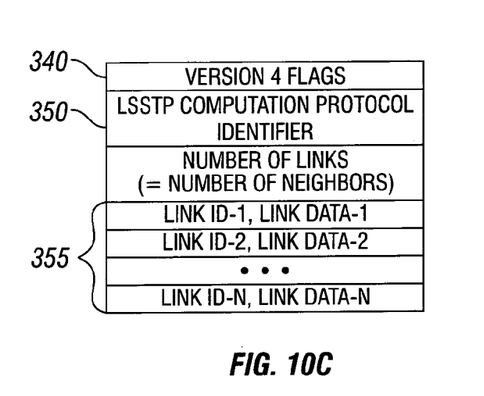

For LSA_BPDUs according to the present invention, there are several options available. These options correspond generally with the different embodiments, described above in the context of discarding LSAs when they are outdated or no longer useful. These options are illustrated in FIGS. 10a through 10c, which show LSSTP parameters for an LSA_BDPU according to three embodiments of the present invention. In each of these embodiments, the respective LSSTP parameters include a Flags field 340 and a LSSTP Computation Protocol Identifier field 345, followed by link description information 355. In FIG. 10a, an optional LSA-removal field 350a includes a Sequence Number along with the Bridge ID of the sending bridge. In FIG. 10b, optional LSA-removal field 350b includes a Path Vector. The LSA removal options associated with each of these LSA-removal fields has been described above (in reference to FIG. 2). In a third embodiment, the TTL information already part of the standard BPDU message is used instead—and therefore no LSA-removal field is necessary—as shown in FIG. 10c. Note that more than one of these LSA-removal options may be used, with appropriate changes made to the LSSTP parameters if needed, but using more than one option is not presently preferred. In an alternate embodiment, no LSA removal option is used at all, but this is not recommended.

Figure 11:
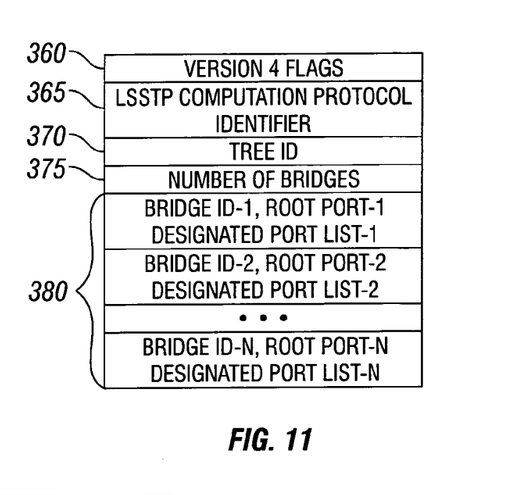
FIG. 11 illustrates LSSTP parameters for a TA_BDPU (tree advertisement BDPU) according to an embodiment of the present invention.

FIG. 11 illustrates LSSTP parameters for a TA_BDPU (tree advertisement BPDU) according to an embodiment of the present invention. This type of message also includes a Flags field 360 and a LSSTP Computation Protocol Identifier field 365. A Tree ID field 370 follows, and a Number of Bridges field 375, which of course specifies the number of bridges in the tree. The individual Bridge fields 380 follow, one for each bridge in the identified tree. The individual Bridge fields each identify the port configuration for one of the bridges in the tree. In this embodiment, the designated forwarding ports for each bridge are specified, and the remaining ports at that bridge are assumed to be discarding ports and configured accordingly. As mentioned above, these discarding ports are preferably configured first, prior to setting the forwarding ports. The root port is also specified, in this embodiment immediately following each Bridge ID. An alternate port toward the root bridge may also be listed (but is not shown in FIG. 11).

Figure 12:
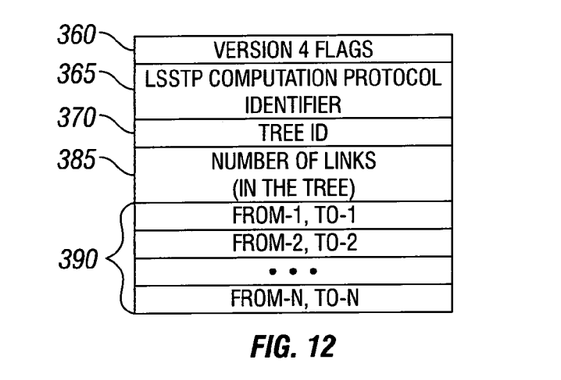
FIG. 12 illustrates simplified LSSTP parameters for a TA_BDPU according to another embodiment of the present invention.

FIG. 12 illustrates simplified LSSTP parameters for a TA_BDPU according to another embodiment of the present invention. Here, following the Tree ID field 370, a Number of Links field 385 relates the number of links in the tree rather than the number of bridges. Links fields 390 therefore follow the Number of Links field 385, and describe the tree in terms of the links between bridges. This reduces the size of he TA_BPDU, but increases the processing complexity as each bridge has to determine the how to set their ports based on the received tree description. Whether this trade-off is desirable may vary from network to network.

Figure 13:
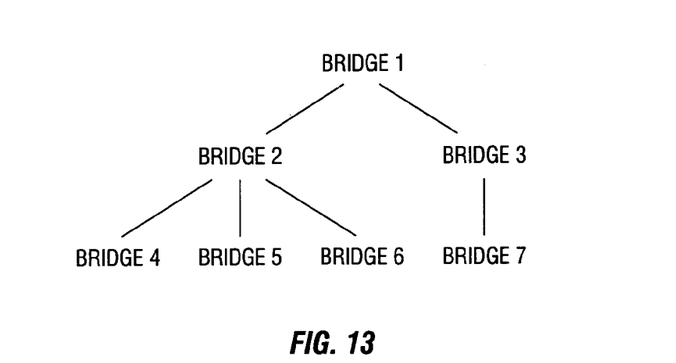
FIG. 13 illustrates an exemplary spanning tree topology for which embodiments of the present invention may be advantageously implemented

An even more abbreviated form may be useful in some applications. The exemplary tree topology of FIG. 13, for example may be advertised using the TA_BPDU sequences illustrated in FIGS. 14-16. As can be seen in FIG. 13, Bridge 1 has two designated ports and hence two branches leading from it, specifically to Bridges 2 and 3. Bridge 2, in turn, has three branches leading out to Bridges 4, 5, and 6, and Bridge 3 had one branch leading to Bridge 7. Bridges 4 through 7 are leaf bridges, and therefore have no branches leading from them.

Figure 14:
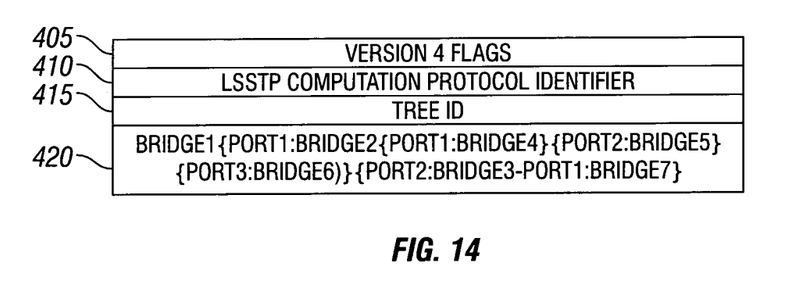
FIG. 14 illustrates a tree description for the Bridge 1 shown in FIG. 9 according to an embodiment of the present invention.

According to this embodiment, a first TA_BPDU message is received in Bridge 1; this message (or rather the relevant portion thereof) is illustrated in FIG. 10. This type of message also includes a Flags field 405 and a LSSTP Computation Protocol Identifier field 410. A Tree ID field 415 follows. After the Tree ID field 415 is a first Tree Description field 420. The first Tree Description field includes the information needed at Bridge 1, namely, the relationship of the links and bridges that follow. As represented in FIG. 14, a first set of brackets encloses the identities of all of the links and bridges associated with port 1 of Bridge 1, and a second set of brackets encloses the identities of all the links and bridges associated with port 2 of bridge 1. Regarding the latter, port 2 is designated to a link to Bridge 3, and port 1 of Bridge 3 is designated to link to bridge 7. Port 1 of bridge 1 is also designated to link to a single bridge, Bridge 2, but since Bridge 2 has three ports, each designated to link to a respective one of Bridges 4, 5, and 6, the designations of Bridge 2's ports are each isolated in a set of interior brackets in the Tree Description field 420 of FIG. 10.

Figure 16:
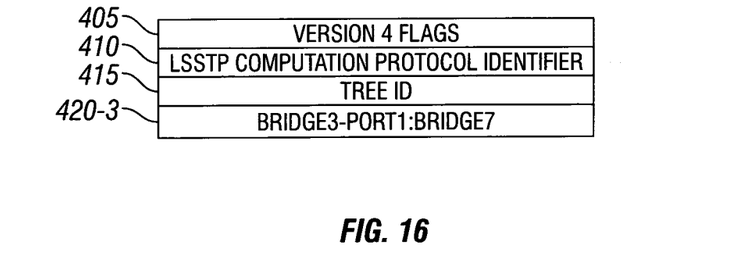
FIG. 16 illustrates a tree description for the Bridge 3 shown in FIG. 9 according to an embodiment of the present invention.

Naturally, Bridge 1 uses the information in the Tree Description field 420 to configure its own ports 1 and 2. It then transmits one modified version of TA_BPDU message to Bridge 2 and another to Bridge 3 using the appropriate ports. In each case, the port designations not applicable to the recipient bridge are removed by Bridge 1 prior to sending. The TA_BPDU sent to Bridge 2 is illustrated in FIG. 15. In FIG. 15, it can be seen that in the Tree Description field 420-2, all that remains are the port assignments for Bridge 2; port 1, for example is designated to link to Bridge 4. Similarly, FIG. 16 illustrates the TA_BPDU, which is transmitted from Bridge 1 to Bridge 3. In FIG. 16, it can be seen that in the Tree Description field 420-3, all that remains is the port assignment for port 1 of Bridge 3, which is designated to link to Bridge 7. For example is designated to link to Bridge 4. Note that Bridges 4 through 7 are leaf bridges and as such have no forwarding ports to set. The TA_BPDUs (not shown) sent to these Bridges are similar to those depicted in FIGS. 14 through 16, but they will have a NULL value for their Tree Description field.

Figure 17:
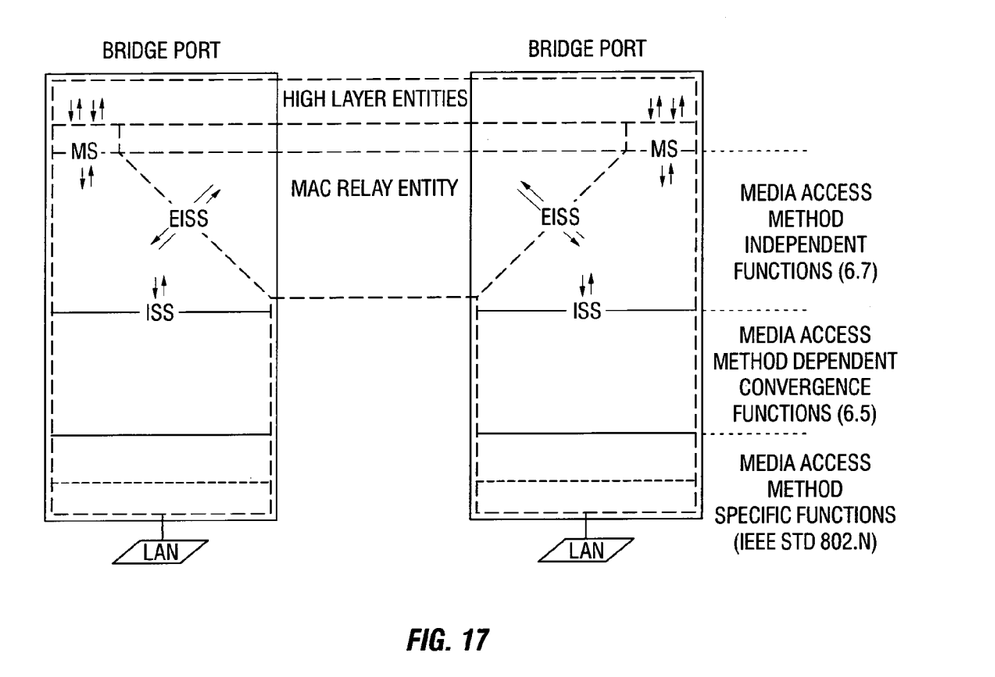
FIG. 17 illustrates a bridge architecture according to an embodiment of the present invention.
Figure 18:
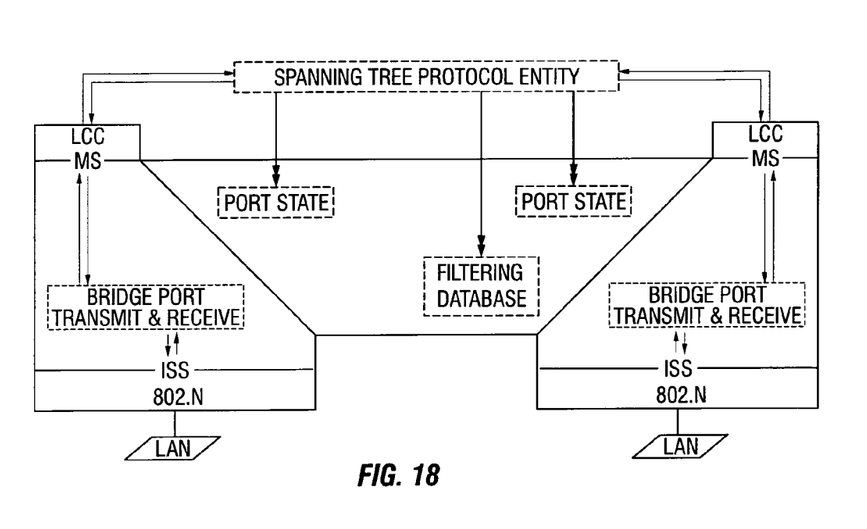
FIG. 18 illustrates an operation of a spanning tree protocol in routing protocol according to an embodiment of the present invention.

FIG. 17 illustrates a bridge architecture according to an embodiment of the present invention. Note that IP link state routing protocols such as OSPF or IS-IS are not suitable without modification for application to forwarding control in Ethernet networks because loop prevention is not assured. In accordance with the present invention, however, the routing protocol entity is implemented as a higher layer as shown in FIG. 17. Operation of the STP (spanning tree protocol) entity as a higher layer entity is illustrated in FIG. 18. The routing protocol entity is attached to each port of a bridge similarly to the SPT entity. In this way, the routing protocol entity is able to send and receive frames on each port. For a routing protocol messages that is to flood the network, the routing protocol entity sends out the message on each port except the port on which the message was received. Other messages are processed by the routing protocol entity and only sent out on designated ports.

As mentioned above, the routing protocols are not applicable without some modification. First, IP addresses are replaced by MAC addresses in the routing protocol and each frame is them forwarded according to the MAC address in its header. Second, tree advertisement is inserted into routing protocol messages and the processing of tree advertisements is implemented in network bridges, as described in more detail above. Note that tree advertisements may be carried in routing protocol objects that are prepared for routing-protocol extensions. For OSPF routing, for example, a new type of Opaque LSA may be required. Opaque LSAs in OSPF provide a generalized for protocol extensions, and tree advertisement may be considered a type of extension. In a preferred embodiment, type-9 (link local) is used for tree advertisement Opaque LSAs. Tree advertisement may also be implemented in an IS-IS routing protocol using similar protocol extensions applicable there.

In accordance with the present invention, tree advertisement messages (TA_BPDUs, for example) should not be flooded, to avoid accidental loops. Rather, they are forwarded only on links that are part of the tree that they advertise, and are sent from a root bridge toward the leaves on its owned tree. Whether the tree topology is calculated in a master bridge or in each root bridge (as in RCOPB), all other affected bridges configure their ports according to the received tree advertisement.

Note that processing of the tree advertisement messages accordance with the present invention may represent a new functionality implemented in the bridges' routing protocol entity. This new functionality includes the proper configuration of the ports that are part of the tree. That is, the bridges send the tree advertisement only to selected neighbor bridges instead of flooding all ports. The bridge may in some embodiments (as mentioned above) have to adjust the tree advertisement before forwarded it on the designated ports. The tree description schemes described above may also be implemented in routing protocols with the proper functionality.

In this manner, link state protocols may be applied for the control of forwarding, that is, configuration of the active topology, in SPB Ethernet networks.

As mentioned above, for MAC learning to function properly in an SPB environment it is important that the respective trees provide symmetric paths between any edge bridge pairs. In accordance with the present invention, any tree calculation algorithm may be used, for example the Dijkstra algorithm, so long as it provides symmetric-path assurance. This will occur if the path costs between the bridge pairs in question are unique. The present invention provides a manner of ensuring that this is the case.

In accordance with the present invention, the list of Bridge IDs used for path calculation is compiled in a way that provides a unique path cost for each path. This is accomplished by using compound path costs. As used herein, the term compound path costs means that each cost figure includes an integer part and a fractional part. The integer part represents the sum of the costs of each link in the path. The fractional part is not calculated, but rather takes a value that is actually a concatenation of the IDs of the bridges on either end of the path. For example, if two bridges with Bridge IDs 1201 and 239, respectively, are separated by two links with respective costs of 3 and 5, the path cost may be represented as 8.1201239. This path cost will always be unique because of the manner in which it is formed, even if another available path is formed by links whose actual costs sum to 8. Path symmetry between the two bridges is assured because the path cost is unique for most if not all topology optimization algorithms.

The present invention also offers support for protection switching in the network. In protection switching, protection trees are calculated in advance for use in the event of a failure. Depending on the network, these protection trees may be calculated by a master bridge, in individual root bridges, or in a separate network management entity if one is used. The calculation is preferably done during a period of time when the network is stable and stored for later use. In one embodiment, the backup trees are not advertised immediately, but in the event a failure is detected, the stored alternate topologies are described in TA_BPDUs and distributed so that they may be implemented quickly.

In another embodiment, when the backup trees are calculated, they are then described in TA_BPDUs that are identified as advertising backup trees and distributed. TA_BPDUs that are identified as backup trees are received and stored in the affected bridges, but not acted upon immediately. In the event that a failure is detected, a topology controller entity (for example, a master bridge) simply sends a BDPU message specially configured to announce that the backup trees should be considered. If multiple alternate topologies are created, the specially-configured BPDU could also indicate which one is to be implemented.

In another embodiment, the probability of occurrence of different failure events is calculated, and alternate topologies are calculated only for those events having a probability exceeding a certain threshold value. Alternately, a desired number of alternate topologies is determined, and alternate topologies are calculated until the desired number is reached. Where multiple alternate topologies are calculated, some could be distributed according to one distribution method and others according to different distribution methods. In addition to the methods according to the present invention and described above, of course, any existing method may be used.

Although the present invention has been described in detail, those skilled in the art should understand that they can make various changes, substitutions and alterations herein without departing from the spirit and scope of the invention in its broadest form.

What is claimed is:

1. A method for setting up and updating multiple trees in an Ethernet network having a plurality of bridges controlled in a link state manner wherein a topology database is available at each bridge and each bridge has a single forwarding tree, said method comprising:
    calculating the single forwarding tree at a root bridge of the tree or in a master bridge only;
    the root bridge advertising the calculated forwarding tree to other bridges participating in the forwarding tree;
    discarding the advertisement if it is determined by a particular bridge that information in the advertisement regarding neighboring bridges has already been learned by the particular bridge;
    configuring the forwarding tree according to the received advertisement by blocking ports not participating in the forwarding tree;
    further distributing the tree advertisement over non-blocked ports within the forwarding tree;
    analyzing potential failure events and assigning a probability of failure value to each event; and
    calculating one or more backup trees for events with a highest probability of failure.

2. The method of claim 1, wherein:
    each root bridge manages its own tree in a Shortest Path Bridging (SPB) network; and
    at least one tree is assigned to each bridge.

3. The method of claim 1, wherein only a root bridge calculates a tree in a Shortest Path Bridging (SPB) network based on its link state topology database for reducing overall computational complexity in the network.

4. The method of claim 1, wherein the root bridge advertises its tree to non-root bridges participating in the tree.

5. The method of claim 1, wherein non-root bridges:
    set a tree associated with the non-root bridges according to the received tree advertisement;
    set blocked links prior to active links; and
    send a modified tree advertisement, which only contains a relevant subtree in a direction of leafs along the tree being configured.

6. The method of claim 1, wherein only the root bridge recalculates the tree after a topology change and initiates the update of its tree in non-root bridges by issuing a new tree advertisement message.

7. The method of claim 1, wherein the tree is a spanning tree determining the active topology of the root bridge.

8. The method of claim 1, wherein the tree belongs to a service and maintained in order to provide connectivity for that service.

9. The method of claim 1, wherein all trees of a Shortest Path Bridging (SPB) network are managed by a master bridge, the master bridge calculating all trees based on its link state topology database and issuing tree advertisement messages for all trees.

10. The method of claim 1, wherein the events with a highest probability of failure comprise specified topology changes.

11. The method of claim 10, wherein:
    the one or more backup trees are stored in the root bridge; and
    the one or more backup trees are advertised as the corresponding topology change appears.

12. The method of claim 10, wherein:
    the one or more backup trees are stored in all non-root bridges; and
    the root bridges only signal a request for activation of the corresponding backup tree to non-root bridges when the topology change appears.

13. The method of claim 12 wherein the non-root bridges set the one or more backup trees.

14. A system for setting up and updating multiple trees in an Ethernet network having a plurality of bridges controlled in a link state manner wherein a topology database is available at each bridge and each bridge has a single forwarding tree, the system comprising:
    a memory; and
    a processor, wherein the processor is operable to:
        calculate the single forwarding tree at a root bridge or receive the calculation of the forwarding tree from a master bridge;
        advertise the forwarding tree from said root bridge to other bridges participating in the forwarding tree;
        discard the advertisement if it is determined by a particular bridge that information in the advertisement regarding the neighboring bridges has already been learned by the particular bridge;
        configure the forwarding trees of other bridges according to the received advertisements;
        distribute the tree advertisement only within the forwarding tree;
        analyze potential failure events and assign a probability of failure value to each event; and
        calculate one or more backup trees for events with a highest probability of failure.

15. The system of claim 14, wherein:
    each root bridge manages its own tree in a Shortest Path Bridging (SPB) network; and
    at least one tree is assigned to each bridge.

16. The system of claim 14, wherein only a root bridge calculates a tree in a Shortest Path Bridging (SPB) network based on its link state topology database for reducing overall computational complexity in the network.

17. The system of claim 14, wherein non-root bridges further comprise a processor operable to:
    set a tree associated with the non-root bridges according to the received tree advertisement;
    set blocked links prior to active links; and
    send a modified tree advertisement, which only contains a relevant subtree in a direction of leafs along the tree being configured.

18. The system of claim 14, wherein the events with a highest probability of failure comprise specified topology changes.

19. The system of claim 18, wherein:
    the one or more backup trees are stored in the root bridge; and
    the one or more backup trees are advertised as the corresponding topology change appears.

20. The system of claim 18, wherein:
    the one or more backup trees are stored in a non-root bridge; and
    the root bridge only signals a request for activation of the corresponding backup tree to non-root bridges when the topology change appears.

* * * * *

UNITED STATES PATENT AND TRADEMARK OFFICE
CERTIFICATE OF CORRECTION

| | | |
|---|---|---|
| PATENT NO. | : 8,837,329 B2 | Page 1 of 1 |
| APPLICATION NO. | : 12/525062 | |
| DATED | : September 16, 2014 | |
| INVENTOR(S) | : Farkas et al. | |

It is certified that error appears in the above-identified patent and that said Letters Patent is hereby corrected as shown below:

In the Specification

In Column 10, Line 33, delete "of he" and insert -- of the --, therefor.

Signed and Sealed this
Tenth Day of March, 2015

Michelle K. Lee
*Deputy Director of the United States Patent and Trademark Office*